United States Patent [19]
Lordier

[11] Patent Number: 5,377,953
[45] Date of Patent: Jan. 3, 1995

[54] DISPOSAL CLOSURE VALVE

[75] Inventor: Edgar T. Lordier, Columbus, Ohio

[73] Assignee: Lynn A. Steinmetz, Columbus, Ohio

[21] Appl. No.: 169,370

[22] Filed: Dec. 20, 1993

[51] Int. Cl.[6] .............................................. F16K 1/22
[52] U.S. Cl. ..................................... 251/305; 251/288
[58] Field of Search ................................ 251/288, 305

[56] References Cited
U.S. PATENT DOCUMENTS 3,291,443  12/1966  Schulz et al. ...................... 251/305
3,479,008  11/1969  Duncan .......................... 251/305 X
3,498,584   3/1970  Bowers ........................... 251/288 X
4,139,590   2/1979  Rubright ......................... 251/305 X Primary Examiner—John C. Fox
Attorney, Agent, or Firm—Thomas S. Baker, Jr.

[57] ABSTRACT

A closure valve assembly for the discharge outlet line of a garbage disposal has a resilient deformable housing which defines a fluid passage and a rigid valve element pivotal in said housing and having an outer circumferential surface with a greater diameter than that of the inside surface of said housing.

1 Claim, 1 Drawing Sheet

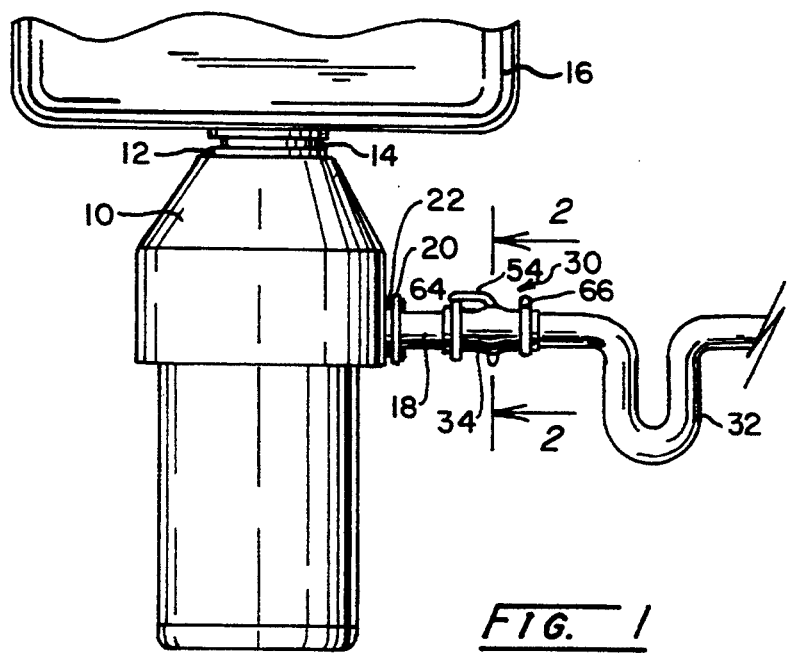
FIG. 1
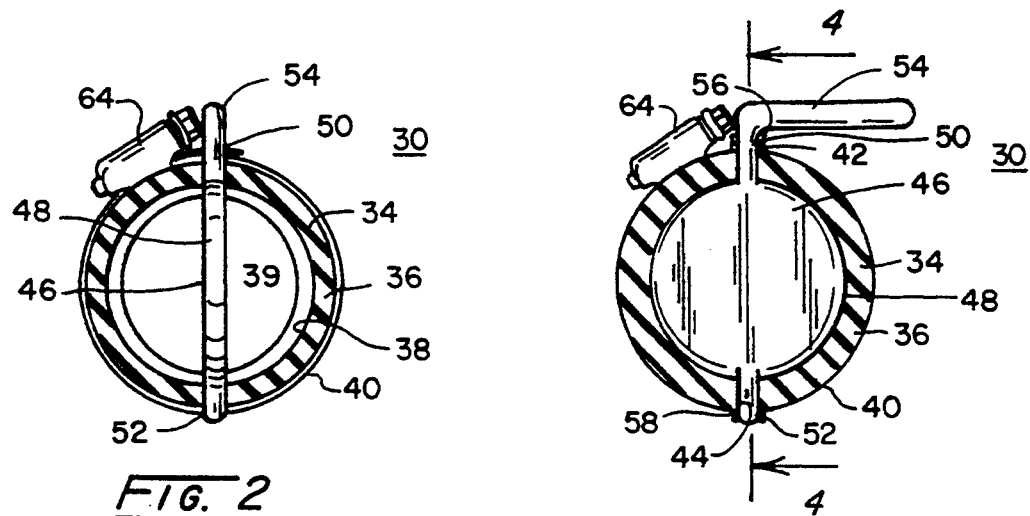
FIG. 2
FIG. 3
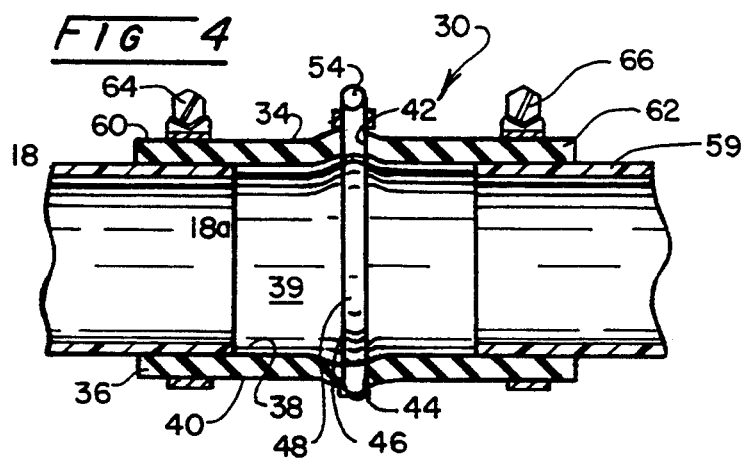
FIG. 4

DISPOSAL CLOSURE VALVE

BACKGROUND OF THE INVENTION

This invention relates to a closure valve adapted to have one end attached to the discharge outlet line of a garbage disposal unit of the type commonly installed in a kitchen sink. Typically garbage disposal units are installed beneath a kitchen sink such that the top part of a grinding chamber is in fluid communication with the drain in the bottom of the sink. Motor driven blades in the bottom of the grinding unit function to cut, chop, and/or grind food waste particles which are placed in the grinding chamber. Water from the sink faucets which flows through the sink drain into the disposal grinding chamber carries the ground up food particles into a discharge outlet line connected to the bottom of the disposal grinding chamber. This line ultimately connects to the residential sewer system.

Over a period of time grease and garbage waste tend to build-up in the internal grinding chamber of the disposal. This build-up causes fluid flow through the unit to be reduced, causes odors and eventually impedes the performance of the disposal unit. When the grease and garbage waste build-up becomes substantial, it is possible that food handled near the sink drain may be contaminated.

Consequently, it becomes desirable to provide a means of cleaning the internal grinding chamber of the garbage disposal unit. Typical attempts to clean internal grinding chambers mainly comprise running liquid cleaners through the units. One problem with liquid cleaners resides in the fact that because the discharge outlet line of the disposal remains open, the cleaner occupies the internal grinding chamber for a very short period of time. Consequently, to be effective any cleaner should be quite strong. Unfortunately high strength cleaners may damage aluminum or alloy components of the disposal unit or may damage seals within the unit. More importantly, because of the very short time cleaners remain within the grinding chamber their effectiveness is greatly compromised.

Consequently, it becomes desirable to provide a disposal unit in which a relatively low strength cleaner may remain within the internal grinding chamber of a disposal for any desired period of time to ensure effective cleaning without damaging the disposal unit itself. This may be accomplished by providing an easily insertable valve system which will block the discharge outlet line of the garbage disposal.

SUMMARY OF THE INVENTION

A closure valve assembly for the discharge outlet line of a garbage disposal. The valve has a resilient, deformable, substantially cylindrical tubular housing having a wall with an inner surface which defines a fluid passage and an outer surface. A rigid, generally circular valve element having an outer cylindrical surface is mounted pivotally in the housing. This element has a diameter greater than the diameter of the inner surface of the housing. The valve element pivots between an open position in which the valve element extends parallel to the fluid passage to allow fluid flow past the valve element and a closed position in which the valve element extends perpendicular to the fluid passage to thereby prevent fluid flow past the valve element. When the valve element is in the closed position the entire outer circumferential surface engages the inner surface of the housing wall causing the housing wall to expand outwardly and sealingly engage the outer circumferential surface.

DESCRIPTION OF THE DRAWINGS

FIG. 1 is a schematic view showing the closure valve assembly of the instant invention attached to a garbage disposal discharge outlet line;

FIG. 2 is line along line 2—2 of FIG. 1;

FIG. 3 is a view similar to FIG. 2 showing the upper valve element in the closed position; and FIG. 4 is a view along line 4—4 of FIG. 3.

DESCRIPTION OF THE PREFERRED EMBODIMENT

Turning to FIG. 1, a garbage disposal unit (10) has a flange (12) which defines a top opening into an internal grinding chamber, not shown, of the disposal. A fluid conduit (14) connects the opening in flange (12) to a drain opening, not shown, in the bottom of a sink (16) in a conventional manner. A disposal discharge outlet line (18) has a flange (20) which overlies and is sealingly attached to an outlet port (22) at the bottom end of the internal grinding chamber of the disposal. In operation, cutter blades in the bottom end of said grinding chamber cut, chop and grind garbage waste which flows into said internal grinding chamber through fluid conduit (14). Water and said ground garbage waste exits the disposal (10) through disposal outlet (18) continues through closure valve (30) into the discharge outlet line (59). Discharge outlet line (59) connects downstream to a sewer line.

The closure valve assembly (30) of the instant invention is attached to the disposal discharge outlet line (59). The closure valve assembly (30) of the instant invention is a compact unit which may be inserted easily at one end of discharge outlet line (18). Typically, line (59) is a one and one half inch line although valve assembly (30) certainly may be made to accommodate lines of other sizes.

Turning to FIGS. 1 through 4, it may be seen that closure valve assembly (30) includes a housing (34) having a wall (36) with an inner surface (38) which defines a fluid passage (39) and an outer surface (40). It has been found desirable to construct housing (34) of a resilient, deformable material having an inside diameter slightly smaller than the outside surface of discharge outlet line (18). Although housing (34) may be constructed from a conventional rubber material, it has been found preferable to construct housing (34) from polyvinyl chloride material having a hardness of between twenty and forty durometer. Such a material provides flexibility for the housing to expand and contract similar to rubber and has all of the desirable characteristics of polyvinyl chloride plastic material used in the plumbing industry. Two diametrally opposite holes (42 and 44) are formed in housing (34).

A rigid generally circular, flat valve element (46) is defined by a circumferential surface (48) having a diameter slightly greater than the diameter of inner surface (38) to provide an interference fit therebetween. A pair of laterally extending projections (50 and 52) extend from diametrally opposite positions of circumferential surface (48) of valve element (46). Projection (50) includes a integral handle extension (54) which extends perpendicular thereto. It has been found preferable to construct valve element (46) by injection molding acrylonitrile butadiene styrene resin material over a continuous 0.125 inch diameter rod which projects from diametrally opposite sides of the resin material to define the projections (50 and 52) and handle (54). Of course, the material other than acrylonitrile butadiene styrene may be utilized to construct the rigid valve element (46). In the preferred embodiment of this invention, it has been found desirable to make the diameter of valve element (46) 1.562 inches and the inside diameter of housing (34) 1.500 inches. Additionally, it has been found desirable to make holes (42 and 44) formed in the walls of housing (34) approximately 0.093 inches in diameter.

Valve element (46) is assembled to housing (34) in the following manner.

Initially, resilient housing (34) is flattened so that it becomes somewhat oval in shape and the long dimension of the oval has a length greater than the diameter of valve element (46). Thereafter, handle extension (54) is inserted into one of the holes (42) in housing (34) until projection (50) provides a first pivot point for the valve element (46). Thereafter, projection (52) is inserted into hole (44) of housing (34) to provide a second pivot point for the valve element (46). It has been found that the 0.93 inch diameter holes formed in housing (34) provide an excellent seal for the projections (50 and 52) where these projections have a diameter of 0.125 inches. The rotation points for the valve element (46) may further be sealed by forcing two 0.25 inch long pieces of rubber tubing (56 and 58) having an inside diameter of 0.093 inches over the projections (50 and 52) until they tightly abut the outside surface (40) of housing (34).

The attachment of valve assembly (30) to end (18a) of discharge outlet line (18) and to one end of a waste water line (59) next will be described.

Turning to FIG. 4, a section having a length of approximately one inch is cut out of waste water outlet line (59). Thereafter, resilient housing (34) is inserted in the cutout space and one end (60) thereof is pushed over the outer surface of disposal discharge outline line (18) and the other end (62) thereof is pushed over the outer surface of waste water line (59). Hose clamps (64 and 66) which overlie ends (60 and 62) of housing (34) are tightened to secure closure valve (30) in the spaced section defined between disposal discharge outlet (18) and waste water line (59). At least one of the clamps (64 and 66) is positioned circumferentially to provide a positive stop for handle extension (54) as will be described hereinbelow.

Operation of closure valve assembly (30) next will be described. Valve element (4,3) is pivotal between an open position (See FIG. 2) in which the valve element extends parallel at the fluid passage (39) to allow fluid flow past the valve element and a closed position (see FIG. 4) in which the valve element (46) extends perpendicular to fluid passageway (39) to prevent fluid flow past the valve element. It may be observed that in the closed position the entire outer circumferential surface (48) of valve element (46) engages the inner surface (38) whereas in the open position only a portion of the circumferential surface (48) engages the inner surface.

Referring again to FIG. 2, it may be observed that an operator may move handle extension (54) to a position generally parallel to the longitudinal axis of housing (34) and fluid passage (39) to allow fluid flow through the passage past valve element (46). In this position one end of handle extension (54) rests against closed clamp (64) which provides a positive stop therefore. Turning to FIG. 3, it may be observed that handle extension (54) may be moved to a position generally perpendicular to the longitudinal axis of housing (34) and fluid passageway (39) to thereby seal fluid passage (39) to prevent fluid flow past valve element (46). It has been found that an excellent seal is provided between the outer circumferential surface (48) of valve element and the inner surface (38) of housing wall (36) where valve element (46) has a diameter of 1.562 inches and the inner surface (38) of wall (36) has a diameter of 1.500 inches as described above. Of course, other dimensions also would be acceptable. It is important only that valve element (46) have a diameter slightly larger than the diameter of the inner surface (38) of wall (36). This allows the flexible polyvinyl chloride tubing to expand and sealingly engage the acrylonitrile butadiene styrene resin valve element, thus resulting in a watertight seal.

Referring again to FIG. 1, when valve element (46) is in the closed position, disposal discharge outlet line (18) is blocked. This enables an operator to flood and maintain a standing water level in the internal grinding chamber of garbage disposal unit (10). This water level may be maintained for a period of time required to adequately soak the internal grinding chamber to loosen waste build-up therein. Typically, a commercially available grease cutting cleaner would be added to the internal grinding chamber and the mixture allowed to remain within the internal grinding chamber for a desired period of time. Subsequent to the soak cycle, a self-cleaning cycle may be initiated by intermittently operating garbage disposal unit (10) for on-off time intervals of 10-15 seconds each. Such operation causes the water within the internal grinding chamber to be agitated and thereby dislodge waste build-up and grease within the chamber. Subsequently, valve element (46) may be moved to the open position and water run through the garbage disposal unit (10) to thereby complete the cleaning.

It has been found that this method of cleaning a garbage disposal is extremely effective and results in a clean odor free garbage disposal unit (10).

Since certain changes may be made in the above-described system and apparatus not departing from the scope of the invention herein and above, it is intended that all matter contained in the description or shown in the accompanying drawings shall be interpreted as illustrative and not in a limiting sense.

I claim my invention as follows:

1. A disposal outlet closure valve assembly comprising:
   a resilient, deformable, substantially cylindrical tubular housing having a wall with an inner surface which defines a fluid passage and an outer surface;
   a rigid, generally circular valve element having an outer circumferential surface and pivotally mounted in said housing;
   the diameter of said valve element being greater than the diameter of said inner surface of said tubular housing to provide an interference fit therebetween;
   said valve element pivotal between an open position in which said valve element extends parallel to said fluid passage to allow fluid flow past said valve element and a closed position in which said valve element extends perpendicular to said fluid passage to thereby prevent fluid flow past said valve element;
   wherein when said valve element is in said closed position, said entire outer circumferential surface engages said inner surface of said housing wall causing said housing wall to expand outwardly and sealingly engage said outer circumferential surface;

pivot means on said valve element for enabling said valve element to pivot;

said pivot means including a pair of diametrically opposite cylindrical projections formed on said valve element;

a pair of diametrically opposite openings formed in said housing wall each adapted to receive one of said projections;

at least one of said projections has a handle extension which passes through said housing wall and extends beyond said outer surface of said housing to enable an operator to grasp said handle extension to move said valve element between said open and closed positions;

a pair of adjustable clamps mounted on the outer surface of said housing one at each end thereof; and said handle extension engages one of said clamps when said valve element is in said open position.

* * * * *